Patented June 30, 1936

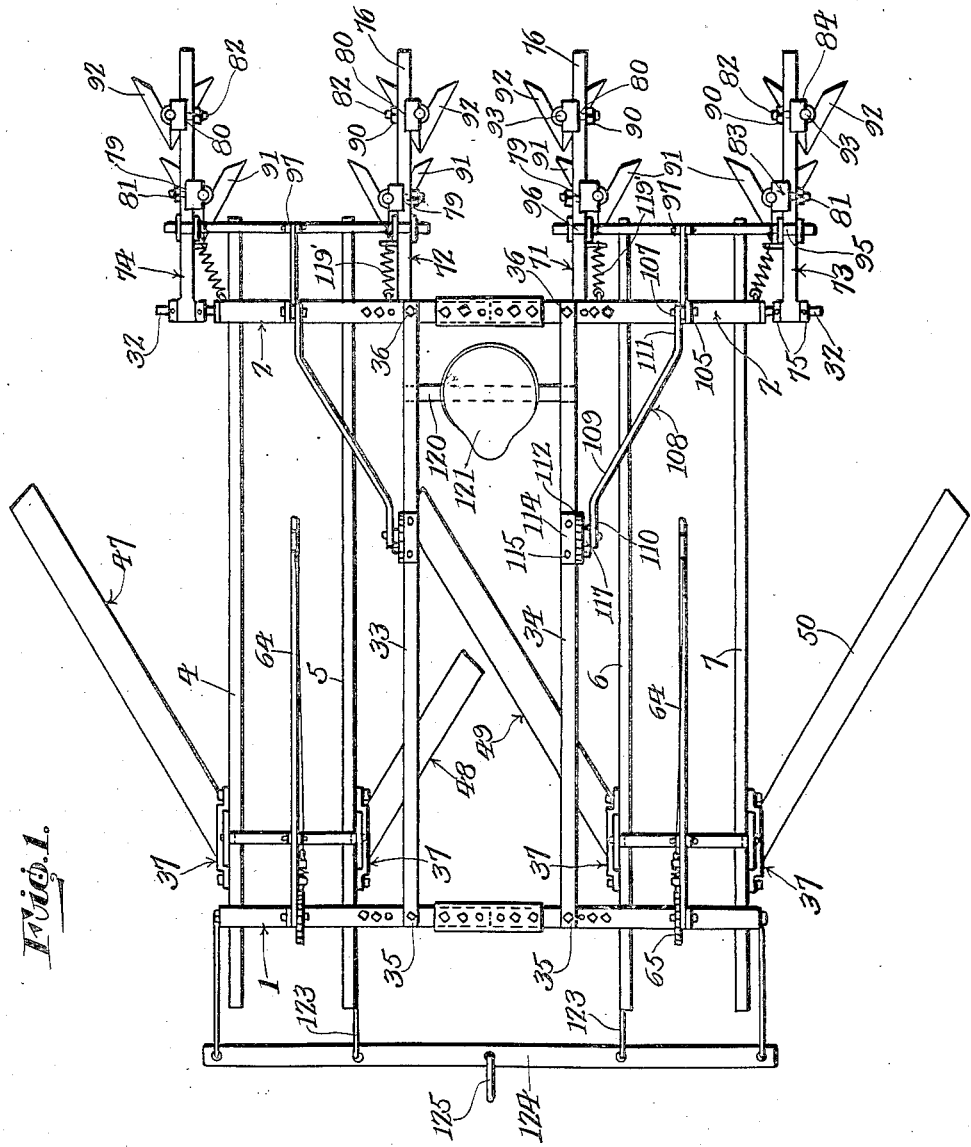

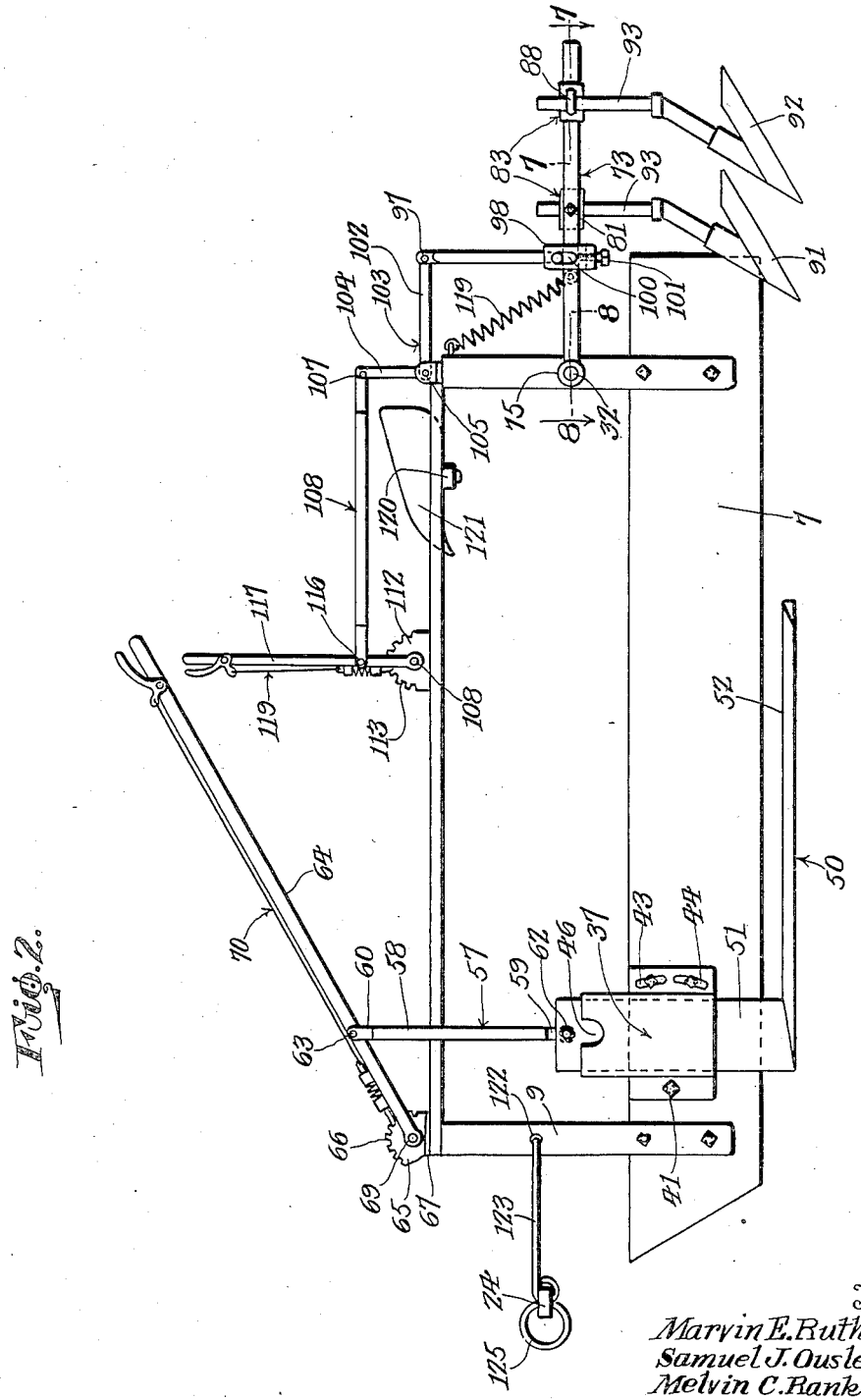

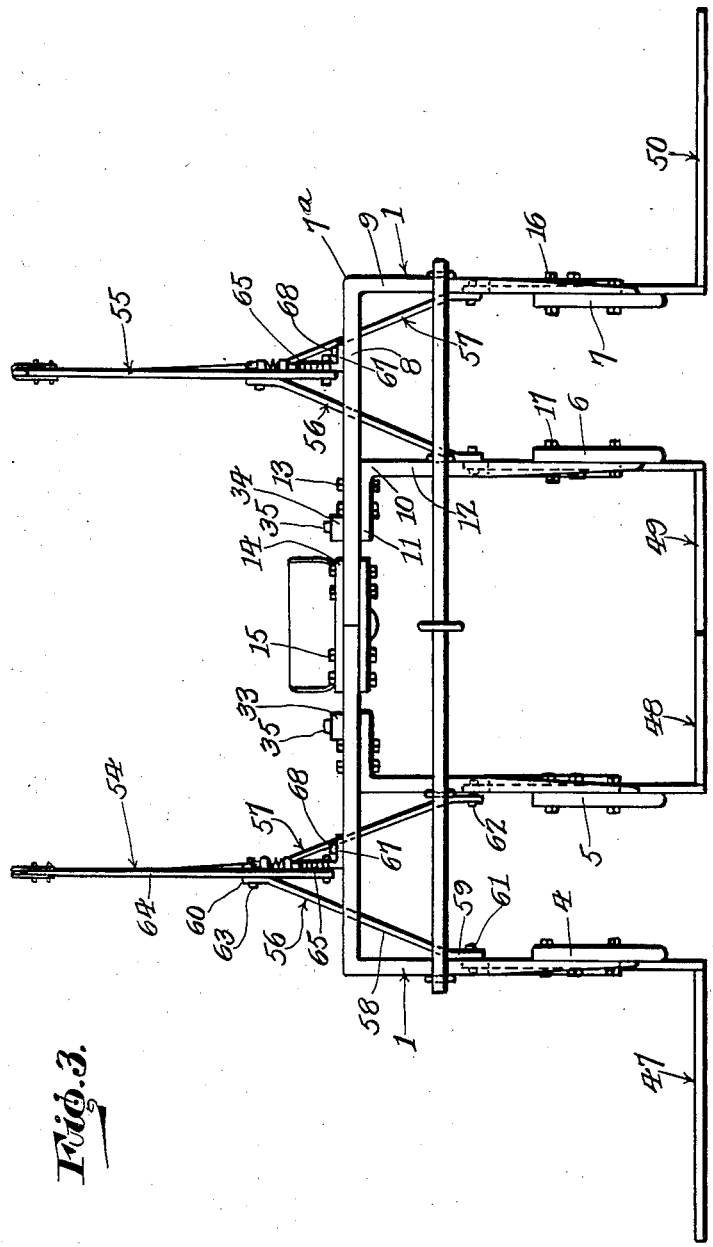

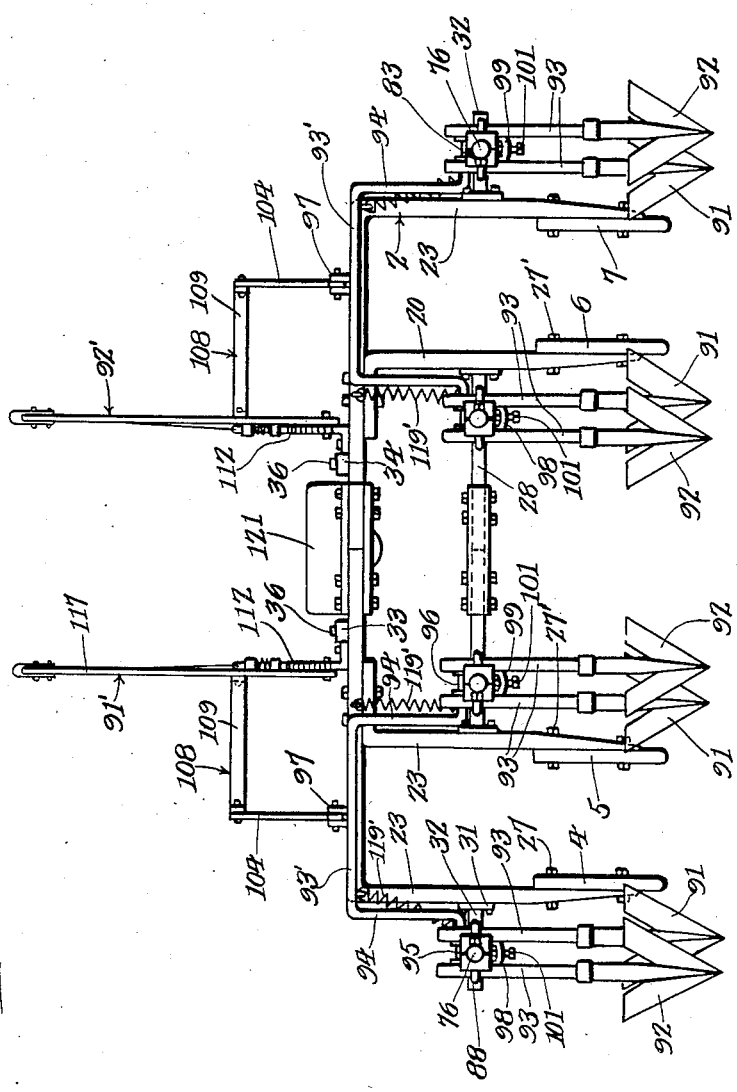

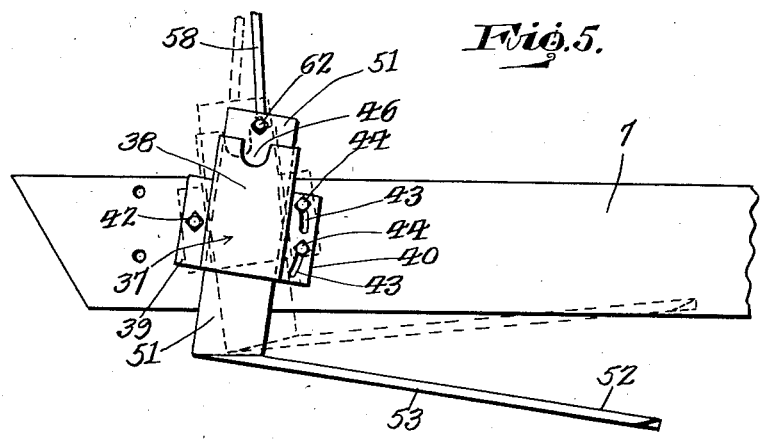
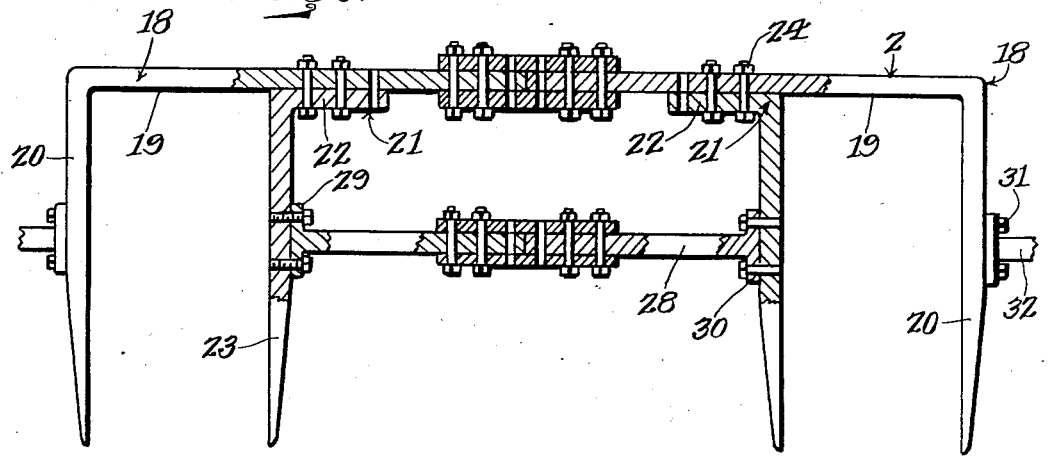
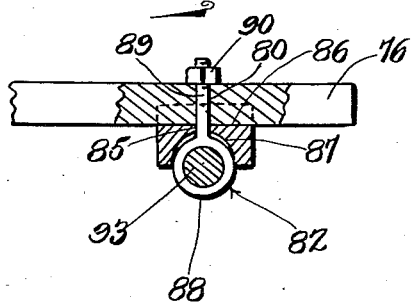
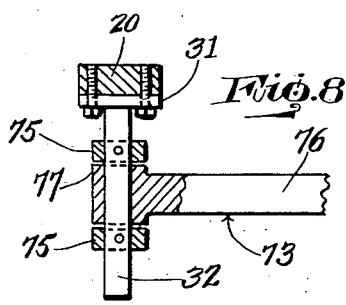

2,046,211

UNITED STATES PATENT OFFICE 2,046,211

COMBINED WEED CUTTER AND CULTIVATOR ASSEMBLY

Marvin E. Rutherford, Samuel J. Ousley, and Melvin C. Rankin, Spur, Tex.

Application November 15, 1934, Serial No. 753,216

10 Claims. (Cl. 97—143)

This invention relates to a combined weed cutter and cultivator assembly and has for its primary object to provide, in a manner as hereinafter set forth, an assembly of the class referred to capable of being efficiently used for agricultural purposes when clearing the soil from weeds and when cultivating.

A further object of the invention is to provide, in a manner as hereinafter set forth, an assembly of the class referred to having the elements thereof so constructed and arranged to provide a weeding out operation in advance of a cultivating action.

A further object of the invention is to provide, in a manner as hereinafter set forth, an assembly of the class referred to with a series of vertically and angularly adjustable weed cutters and a series of vertically adjustable pairs of cultivating elements whereby said cutters and elements may be set in a position to obtain a thoroughly efficient weeding out operation and cultivating action.

A further object of the invention is to provide, in a manner as hereinafter set forth, an assembly of the class referred to with weed cutters arranged in pairs, and two sets of cultivating elements whereby a pair of weed cutter elements may be independently adjusted relative to the other pair and a set of cultivating elements may be independently adjusted relative to the other set.

Further objects of the invention are to provide, in a manner as hereinafter set forth, an assembly of the class referred to which is comparatively simple in its construction and arrangement for obtaining the purpose intended thereby, strong, durable, readily set up, enabling the repairing when occasion requires to be expeditiously performed, thoroughly efficient when used and comparatively inexpensive to set up and maintain.

To the above ends essentially and to others which may hereinafter appear, the invention consists of such parts and such combination of parts which fall within the scope of the invention as claimed.

In the drawings:

Figure 1 is a top plan view of the combined cutter and cultivator assembly.

Figures 2, 3 and 4 are respectively a side elevation, a front elevation and a rear elevation of the assembly, Figure 5 is a fragmentary view in side elevation illustrating in full and dotted lines a cutter blade in adjusted positions relative to a runner, Figure 6 is a front elevation partly in section of the adjustable rear carrier for the runners, Figure 7 is a sectional detail on line 7—7, Figure 2, and Figure 8 is a sectional detail on line 8—8, Figure 2.

The assembly includes front and rear carriers 1, 2 respectively for the runners 4, 5, 6 and 7. The carriers 1, 2 are arranged in parallel spaced relation. The carrier 1 is formed of a pair of substantially inverted yoke-shape sections of like form connected together at their upper ends. Each section of carrier 1 is formed of an upstanding angle shape bar 7ª consisting of a horizontal part 8 and a vertical part 9 which depend from the outer end of part 8, an angle shape bar 10 formed of a horizontal part 11 and a vertical part 12 depending from the outer end of part 11. The part 8 of bar 7ª is of materially greater length than part 11 of bar 10. The parts 9 and 12 are arranged in parallel spaced relation and correspond in length. The part 8 is of greater length than part 10. The latter is positioned against the lower face of part 8 adjacent the inner end of the latter and is anchored to part 8 by the hold-fast means 13. The inner ends of the parts 8 of the sections of carrier 1 oppose each other. The parts 8 are secured together by the coupling plates 14 and holdfast devices 15. The parts 11 are arranged in parallel spaced relation but the distance therebetween is greater than the distance between parts 9 and 11.

The parts 9 are secured to the outer side faces of the runners 4, 7 by the holdfast means 16. The parts 11 are secured to the outer side faces of the runners 5, 6 by the holdfast devices 17. The arrangement of a part 9 and a part 11 with respect to a pair of runners 4, 5 or 6, 7 is that such parts are not disposed therebetween. Each runner is of substantially oblong contour and stands on its lower lengthwise edge. Each runner has its forward end edge 17 inclining forwardly from its bottom edge to its top edge. The parts 9 and 11 of carrier 1 are positioned in close proximity to the forward ends of the runner.

The rear carrier 2 is formed of a pair of substantially inverted yoke-shape sections of like form connected together at their upper ends. Each section of carrier 2 is formed of an upstanding angle-shape bar 18 consisting of a horizontal part 19 and a vertical part 20 depending from the outer end of part 19, an angle-shape bar 21 formed of a horizontal part 22 and a vertical part 23 depending from the outer end of part 22. The part 19 of bar 18 is of materially greater length than the part 22 of bar 21. The parts 20 and 23 are arranged in parallel spaced relation and correspond in length. The part 19 is of greater length than part 22. The latter is positioned against the lower face of part 19 adjacent the inner end of the latter and is secured to part 19 by the holdfast means 24. The inner ends of the parts 19 of the sections of the carrier oppose each other and the said parts 19 are secured together by the coupling plates 25 and holdfast devices 26. The parts 23 are arranged in parallel spaced relation, but the distance therebetween is greater than the distance between parts 20 and parts 23.

The parts 20 are secured by the holdfast means 27 to the outer side faces of the runners 4, 7 in proximity to the rear ends of the latter. The parts 23 are secured by the holdfast means 27' to the outer side faces of the runners 5, 6 in proximity to the rear ends of the latter.

The carrier 2 also includes a sectional adjustable beam supporting member 28 which is arranged between and has its ends secured, as at 29, 30, to the parts 23 thereof. Anchored to the outer side of each part 29 of carrier 2, as at 31, is a laterally extending beam supporting member 32.

The inner ends of the parts 8 of carrier 1 and the inner ends of the parts 19 of carrier 2 are apertured, such as shown with respect to parts 19, Figure 6. The coupling plates 14, 25 are apertured, such as shown with respect to plates 25, Figure 6. By this arrangement, in connection with the holdfast devices 15 and 26, the sections of the carriers may be laterally adjusted with respect to each other and secured together in their adjusted position. The adjustability of the member 28 will permit of the sections of carrier 2 being adjusted. When the sections of the carriers are adjusted the runners 4, 5 are adjusted relatively to the runners 6, 7 or vice versa. As shown, the connection between bars 8 and 18 and bars 18 and 21 is such as to permit of adjusting part 11 relative to part 9 and part 23 relative to part 20 whereby the distance between parts 9, 11 or 20, 23 may be increased. The carrier 2 is of greater length than carrier 1 and acts as a drag for the plow beams to be hereinafter referred to.

The carriers 1, 2 are connected together by a pair of spaced parallel combined coupling and supporting bars 33, 34 secured at their forward ends, as at 35, in proximity to the ends of the plates 14 and at their rear ends, as at 36, in proximity to the ends of plates 25.

Secured to the outer sides of the runners 4, 5, 6 and 7, rearwardly of, but in proximity to the parts 9 and 12 of the carrier 1, are upstanding angularly adjustable cutting blade guides 37 of like form, and as shown, the said guides extend above the top edges of the runners. Each guide 37 (Figure 5) consists of a channelled shaped guide member 38 which opens inwardly and is closed for a portion of its length by a runner. Oppositely disposed flanges 39, 40 are integral with the lower portions of the sides of member 38. The flanges abut the outer side face of a runner. The flange 39 is mounted on a pivot carried by the runner. The said pivot consists of a headed bolt 41 carrying a securing nut 42. The flange 40 is formed with a pair of spaced oppositely extending arcuate slots 43. Carried by the runner is a pair of bolts 44 which extend through the slots 43 and are provided with securing nuts 45. By the foregoing arrangement a guide may be adjusted, with respect to its pivot, forwardly and rearwardly at an inclination with respect to a runner and in this connection attention is directed to Figure 5. The top edge of member 38 is formed with a semi-oval shaped cutout 46 thereof to provide a clearance for a purpose to be referred to.

The assembly includes four cutters 47, 48, 49 and 50. The cutters 47, 48 are oppositely disposed with respect to each other. The cutters 49, 50 are oppositely disposed with respect to each other. Each of the cutters includes a flat cutting blade of like form, with this exception that the blade of cutter 48 is of less length than the blades of the cutters 47, 49 and 50. The blades of the cutters 47, 49 and 50 are of the same length. The cutters 47, 48, 49 and 50 are associated with the runners 4, 5, 6 and 7 respectively. Each cutter includes a rectangular upstanding shank 51 slidably extending through the member 38 of a guide 37. The lower end of shank 51 merges into the forward end of the outer side edge of a flatwise disposed cutting blade 52 of oblong contour disposed at an outwardly inclination with respect to a runner. The blade 52 has a cutting edge 53. The faces of a blade are disposed at right angles to the side faces of a shank. The blade may be adjusted at an upward and at a downward inclination from front and to rear and in this connection attention is directed to Figure 5. The adjustment of a blade is simultaneously had with the adjustment of the guide with which it is associated. The blade may also be vertically adjusted and the means whereby this adjustment may be had will be presently referred to.

The blade 52 of cutter 47 is arranged outwardly with respect to runner 4. The blades of cutters 48, 49 are arranged between runners 5, 6. The blade of cutter 49 extends rearwardly at an inclination beyond the rear end of the blade of cutter 48. The blade of cutter 50 is arranged outwardly with respect to runner 7.

There is common to the cutters 47, 48 a manually operable vertically adjusting means 54 therefor and which, when operated, simultaneously adjusts the said pair of cutters. There is common to the cutters 49, 50 a manually operable vertically adjusting means 55 therefor and which, when operated, simultaneously adjusts cutters 49, 50. The means 54 is independent of the means 55. The means 54 is of the same construction as the means 55. But one of the said means will be described, as the description thereof will apply to the other. Each vertically adjusting means common to a pair of cutters consists of a pair of oppositely disposed hangers 56, 57 formed of an intermediate inclined stretch 58 and a pair of end stretches 59, 60 disposed in parallel planes. The end stretches 59 of the hangers 56, 57 are pivotally connected as at 61, 62 to the upper ends of a pair of cutters. The end stretches 60 of the hangers 56, 57 are pivotally connected as at 63 to an upstanding rearwardly inclined lever 64 in proximity to the lower or forward end of the latter. Secured upon the part 8 of each section of carrier 1 is a vertically disposed substantially quadrant shaped plate 65 having its top edge toothed, as at 66. The lower end of plate 65 is flanged as at 67 and extending through said flange is a holdfast means 68 which anchors plate 65 to part 8. The lower or forward end of lever 64 is pivotally connected, as at 69 upon one side of the plate 65. Associated with the plate 65 and carried by the lever 64 is a spring controlled dog, link and lever device 70 for the purpose of retaining the means 54 or 55 when adjusted whereby a pair of cutters will be held in set position.

Pivotally mounted at their forward ends upon the member 28 is a pair of spaced rearwardly extending plow beams 71, 72. Pivotally mounted at their forward ends upon the members 32 are rearwardly extending plow beams 73, 74. Stop collars 75 are carried by the members 32 for the forward ends of the beams 73, 74. The plow beams are of like length and of the same construction and the description of one will apply to the other. Each beam consists of a bar 76 having an enlarged forward end 77 provided with an opening 78 (Figure 8). The bar 76 intermediate its ends is formed with a pair of spaced openings 79, 80 and with reference to Figure 7 opening 80 is shown. Extending through the openings 79, 80 is a pair of oppositely disposed eye-bolts 81, 82 respectively whereby the eyes of said bolts will be arranged on opposite sides of a beam.

There is positioned upon opposite sides of each beam, in overlapping relation with respect thereto, a pair of oppositely disposed retaining blocks 83, 84 of like form, each of which is formed with a transverse opening 85, a longitudinal groove 86 in its inner side and a vertical groove 87 in its outer side. The opening 85 establishes communication between the grooves, and when a block is mounted on a beam registers with an opening 79 or 80.

The eye 88 (Figure 7) of a bolt 81 or 82 is adapted to extend into a groove 87; the shank 89 of a bolt 81 or 82 extends from the groove 87 through an opening 85 and through an opening 79 or 80. The shanks of the bolt 81 or 82 carry securing nuts 90 which abut against that side of a beam opposite that side which abuts a block 83 or 84. The blocks when in position, overlap the top and bottom of a beam.

Depending from each beam is a pair of cultivator shovels or plows 91, 92 arranged tandemwise and with the plows arranged on opposite sides of the beam. Each plow includes a standard 93 of circular cross section which extends through and snugly engages the eye 88 of a bolt 81 or 82. The blocks 83, 84 and bolts 81, 82 provide for clamping the plow standards to the beam. When the plows are coupled to the beams, the plows of each pair are disposed in staggered relation with respect to each other.

There is provided for the pair of beams 71, 73 an angularly adjusting spring controlled means 91 therefor for the purpose of elevating and lowering the plows carried by said beams. There is provided for the pair of beams 72, 74 an angularly-adjusting spring controlled means 92' therefor for the purpose of elevating and lowering the plows carried by beams 72, 74. The said means 91', 92' are manually operable independently of each other. The means 91', 92' are of like construction and the description of one will apply to the other.

The means 91' or 92' consist of arch shaped member 93' having the lower ends of its side 94 formed with angularly positioned oppositely disposed extensions 95, 96 which seat upon the top of the beams 71, 73 or 72, 74. Centrally of the top of member 93' a pair of spaced upstanding parallel slotted lugs 97 are arranged. The beams 71, 73 or 72, 74 have positioned against the sides thereof a depending yoke. The yokes associated with the beams 71, 73 or 72, 74 are designated 98, 99. The yokes also extend above the top of the beams. The sides of each yoke are formed with aligning vertical slots 100 (Figure 2). The extensions 95, 96 extend through the slots 100 of yokes 98, 99 respectively. For the purpose of fixedly securing the extensions 95, 96 on the beams, clamping screws 101 are carried by the bottoms of the yoke and bind against the bottoms of the beams. Pivotally and loosely connected to the lugs 97 is the horizontal arm 102 of an upstanding bell crank lever 103. The other or vertical arm of lever 103 is designated 104 and is of less length than arm 102. The tops of members 93' align with the tops of the sections of the carrier 2. Each section of the carrier 2 has its top provided with a pair of spaced parallel apertured lugs 105 to which lever 103 is pivoted as at 106. The upper end of the arm 104 is pivotally connected, as at 107 to the rear end of a horizontally disposed pull link 108. The latter includes an intermediate stretch 109 inclining outwardly from front to rear and a pair of end stretches 110, 111 disposed in parallel planes. The arm 104 is connected to stretch 111. Supported from bar 33 or 34 is a substantially semi-circular shaped plate 112 having its top edge toothed, as at 113. The plate 112 at its bottom is flanged, as at 114. The flange seats upon a bar 33 or 34 and is anchored thereto by the holdfast means 115. The plate 112 is offset with respect to a bar 33 or 34. The stretch 110 of link 108 is pivotally attached, as at 116 to a manually operable upstanding lever 117 in proximity to the lower end of the latter. The lever 117 is pivotally connected at its lower end, as at 118 to the plate 112. Carried by the lever 117 is a spring controlled dog link and lever device 119. The beams are connected to the sections of carrier 2 by controlling springs 119'.

A transverse support 120 is secured to the bars 33, 34 which carries a seat 121.

The parts 8, 9 of the sections of the carrier 1 are apertured as at 112 and loosely extending into said apertures are the rear ends of a series of forwardly extending coupling members 123, which at their forward ends are loosely connected to a draw bar 124 carrying a clevis 125.

The cutouts 46 in the members 38 form clearance for the pivots 62 when the cutters are lowered.

What we claim is:

1. In an agricultural machine, a rear support formed of a pair of inverted yoke-shaped sections adjustably connected together, an adjustable brace between said sections, a front support arranged in parallelism to the rear support and formed of a pair of inverted yoke-shaped sections adjustably connected together, means for connecting said supports together, a pair of runners connecting one of the sections of the rear support to one of the sections of the front support, a pair of runners connecting the other section of the rear support to the other section of the front support, said runners being secured to and depending from the sides of the sections of the said supports, and vertically and angularly adjustable cutters connected with and extending at an outward inclination with respect to said runners.

2. In an agricultural machine, a runner, a channel-shaped guide positioned at the outer side of and extending above said runner, said guide opening towards the outer side of the runner and having its lower portion formed with oppositely disposed lateral flanges, means extending through said flanges for connecting the guide to the runner, a cutter formed of a flat stem of a height greater than that of the runner and extending through said guide, said cutter further including an angularly disposed blade at the lower end of said stem, means for vertically adjusting the cutter, and said flanges provided with means coacting with said connecting means for bodily angularly adjusting the guide and the cutter forwardly and rearwardly with respect to the runner.

3. In an agricultural machine, two spaced pairs of spaced weed cutters, each cutter including a flat vertical shank terminating at its lower end into an angularly disposed rearwardly extending flat horizontal cutting blade, the cutters of each pair being oppositely inclined, two spaced pairs of spaced runners, the shanks of said cutters positioned at the outer sides of and of greater height than that of the runners, upstanding channel-shaped guides opening towards, positioned against the outer sides of and extending above the runners, said guides having their lower portions formed with oppositely disposed lateral flanges, means for connecting said flanges to the runners, means connected to the shanks for vertically adjusting the cutters, and the said flanges having means coacting with said connecting means to provide for the forward and rearward adjusting of the guides with respect to the runners to position the cutters at an upward and downward inclination with respect to the runners.

4. In an agricultural machine, a rear support including two spaced pairs of spaced depending arms, a front support including two spaced pairs of spaced depending arms, the arms of one support aligning with the arms of the other support, runners connected to the inner side of the said arms and extending forwardly and rearwardly with respect to said supports, means secured to the top of the supports for connecting them together, a channel-shaped guide secured to the outer side of each runner and extending above the latter, a flat shank extending through each guide and depending below and extending above a runner, blades having their forward ends merging in the lower ends of the shanks, and means pivotally connected to the upper ends of the shanks for vertically adjusting them.

5. In an agricultural machine, a rear support including two spaced pairs of spaced depending arms, a front support including two spaced pairs of spaced depending arms, the arms of one support aligning with the arms of the other support, runners connected to the inner side of the said arms and extending forwardly and rearwardly with respect to said supports, means secured to the top of the supports for connecting them together, a channel-shaped guide secured to the outer side of each runner and extending above the latter, a flat shank extending through each guide and depending below and extending above a runner, blades having their forward ends merging in the lower ends of the shanks, means pivotally connected to the upper ends of the shanks for vertically adjusting them, and said guides provided with clearances at their upper ends for the pivotal connection between the shanks and the vertical adjusting means for the shanks.

6. In an agricultural machine, a lengthwise adjustable rear support formed with two spaced pairs of depending spaced arms, a lengthwise adjustable front support formed of two spaced pairs of depending spaced arms, runners secured to said arms and depending below the lower ends of the latter, means for connecting said supports together, channel-shaped guides secured to the outer side of said runners in proximity to said front support and extending above the runners, a set of cutters, each cutter including a flat shank slidably mounted in the guide and terminating at its lower end in a rearwardly directed blade, a pair of vertically adjusting means, each common to a pair of cutters, each vertically adjusting means being pivotally connected to the upper ends of the shanks of a pair of cutters, and means to provide for the angularly adjusting bodily together of a guide and cutter at a forward and rearward inclination with respect to the runner.

7. In an agricultural machine, a lengthwise adjustable rear support formed with two spaced pairs of depending spaced arms, a lengthwise adjustable front support formed of two spaced pairs of depending spaced arms, runners secured to said arms and depending below the lower ends of the latter, means for connecting said supports together, channel-shaped guides secured to the outer side of said runners in proximity to said front support and extending above the runners, a set of cutters, each cutter including a flat shank slidably mounted in a guide and terminating at its lower end in a rearwardly directed blade, a pair of vertically adjusting means, each common to a pair of cutters, each vertically adjusting means being pivotally connected to the upper ends of the shanks of a pair of cutters, and means to provide for the angularly adjusting bodily together of a guide and cutter at a forward and rearward inclination with respect to the runner, the said pair of adjusting means being mounted in spaced relation on and extended from the top of said front support.

8. In an agricultural machine, a lengthwise adjustable rear support formed with two spaced pairs of depending spaced arms, a lengthwise adjustable front support formed of two spaced pairs of depending spaced arms, runners secured to said arms and depending below the lower ends of the latter, means for connecting said supports together, channel-shaped guides secured to the outer side of said runners in proximity to said front support and extending above the runners, a set of cutters, each cutter including a flat shank slidably mounted in a guide and terminating at its lower end in a rearwardly directed blade, a pair of vertically adjusting means, each common to a pair of cutters, each vertically adjusting means being pivotally connected to the upper ends of the shanks of a pair of cutters, means to provide for the angularly adjusting bodily together of a guide and cutter at a forward and rearward inclination with respect to the runner, a draw-bar disposed forwardly of and in transverse relation to said front support, and forwardly directed coupling members loosely connected to the arms of the front support and to said draw-bar.

9. In an agricultural machine, a lengthwise adjustable rear support formed with two spaced pairs of depending spaced arms, a lengthwise adjustable front suppport formed of two spaced pairs of depending spaced arms, runners secured to said arms and depending below the lower ends of the latter, means for connecting said supports together, channel-shaped guides secured to the outer side of said runners in proximity to said front support and extending above the runners, a set of cutters, each cutter including a flat shank slidably mounted in a guide and terminating at its lower end in a rearwardly directed blade, a pair of vertically adjusting means, each common to a pair of cutters, each vertically adjusting means being pivotally connected to the upper ends of the shanks of a pair of cutters, means to provide for the angularly adjusting bodily together of a guide and cutter at a forward and rearward inclination with respect to the runner, the said pair of adjusting means being mounted in spaced relation on and extended from the top of said front support, a draw-bar disposed forwardly of and in transverse relation to said front support, and forwardly directed coupling members loosely connected to the arms of the front support and to said draw-bar.

10. In an agricultural machine, a pair of front inverted yoke-shaped elements disposed in sidewise relation and each formed at its top with an inwardly extending part, means for adjustably connecting said inwardly extending parts in endwise alignment, a pair of rear inverted yoke-shaped elements arranged in parallel spaced relation to said front elements and each having an inwardly extending part, means for adjustably connecting the inwardly extending parts of the rear elements together, an adjustable bracing means between said rear elements, two pairs of runners, the runners of one pair being secured to a front and rear element and depending below such elements, the runners of the other pair being secured to the other front and the other rear element and depending below such elements, said runners extending rearwardly with respect to the rear elements and forwardly with respect to the front elements, a channel-shaped guide secured to the outer side of each runner in proximity to a front element, two pairs of cutters, each cutter including a flat shank terminating at its bottom into a rearwardly directed blade, said shanks extending upwardly through and above said guides, a pair of vertically adjusting means for the cutters, each adjusting means being pivotally connnected to the shanks of a pair of cutters, said adjusting means mounted on said front elements, and means for connecting the upper ends of the front elements to the upper ends of the rear elements.

MARVIN E. RUTHERFORD.
SAMUEL J. OUSLEY.
MELVIN C. RANKIN.